United States Patent [19]

Boiocchi et al.

[11] Patent Number: 5,370,168
[45] Date of Patent: Dec. 6, 1994

[54] RADIAL TIRE HAVING A TREAD PROVIDED WITH SUB-CIRCUMFERENTIAL LONGITUDINAL GROOVES

[75] Inventors: Maurizio Boiocchi, Segrate; Gianfranco Colombo, Concorezzo; Renato Caretta, Gallarate, all of Italy

[73] Assignee: Pirelli Coordinamento Pneumatici S.p.A., Milan, Italy

[21] Appl. No.: 907,749

[22] Filed: Jun. 29, 1992

[30] Foreign Application Priority Data

Jul. 4, 1991 [IT] Italy .............................. MI91A001840

[51] Int. Cl.$^5$ ................................................ B60C 11/08
[52] U.S. Cl. ................................................... 152/209 R
[58] Field of Search ............ 152/209 R, 209 A, 209 D; D12/141–149

[56] References Cited

U.S. PATENT DOCUMENTS

| | | |
|---|---|---|
| D. 284,364 | 6/1986 | Nakanishi et al. ............... D12/147 |
| 3,986,545 | 10/1976 | Montagne . |
| 4,146,415 | 3/1979 | Caretta et al. . |
| 4,351,381 | 9/1982 | Roberts et al. . |
| 4,619,243 | 10/1986 | Vironneau et al. . |
| 4,726,407 | 2/1988 | Hayakawa et al. ............ 152/209 R |
| 4,819,704 | 4/1989 | Misawa et al. ............... 152/209 R |
| 4,953,604 | 9/1990 | Shepler et al. ............... 152/209 R |
| 4,962,801 | 10/1990 | Tsuda . |
| 5,105,864 | 4/1992 | Watanabe et al. ............ 152/209 R |

FOREIGN PATENT DOCUMENTS

| | | |
|---|---|---|
| 2232454 | 1/1975 | France . |
| 2588514 | 4/1987 | France . |
| 8914853 | 2/1990 | Germany . |
| 9005029 | 7/1990 | Germany . |
| 0124412 | 7/1984 | Japan ......................... 152/209 D |
| 0139502 | 6/1986 | Japan ......................... 152/209 R |
| 0136801 | 5/1989 | Japan ......................... 152/209 R |
| 2179505 | 7/1990 | Japan ......................... 152/209 R |
| 4043105 | 2/1992 | Japan ......................... 152/209 R |
| 4050006 | 2/1992 | Japan . |
| 0489359 | 10/1936 | United Kingdom ............ 152/209 R |
| 2229974 | 10/1990 | United Kingdom . |

OTHER PUBLICATIONS

Gummibereifung, vol. 57 No. 10, 1981, Bielefeld, Deutschland p. 91; "ECR Profiele, Type EW3".

Primary Examiner—Michael W. Ball
Assistant Examiner—Nancy T. Krawczyk
Attorney, Agent, or Firm—Stevens, Davis, Miller & Mosher

[57] ABSTRACT

A tread pattern of a radial tire for motor-vehicles offering high performance comprises oblique longitudinal grooves, inclined to the circumferential direction of the tire by an angle included between 2° and 20°, the opposite ends of said grooves being axially offset relative to one another: all grooves may be inclined in the same direction or may converge, preferably symmetrically, towards the mid-circumferential plane of the tire, specifically for directional patterns. The longitudinal grooves are associated with a plurality of transverse grooves having their central portion inclined in the opposite sense relative to the longitudinal grooves, according to an angle included between 30° and 80°, with respect to the circumferential tire direction. The combination of the longitudinal and transverse grooves according to the established inclinations defines plugs on the tire contact-area. Tangential forces generally combining with one another thereby generating a resultant force having the axial component (drift force) of substantially zero value.

8 Claims, 3 Drawing Sheets

RADIAL TIRE HAVING A TREAD PROVIDED WITH SUB-CIRCUMFERENTIAL LONGITUDINAL GROOVES

BACKGROUND OF THE INVENTION

The present invention relates to motor-vehicle tires and specifically to tires having a radial carcass and suitable for medium and/or high class motor-vehicles in which tires affording high performance are required. More particularly, the invention relates to the tread pattern in said tires.

It is known that tires have a thick tread band disposed on the crown of the carcass in which a relief pattern exhibiting longitudinal and/or transverse grooves is formed by molding, said pattern having the function of giving the tire some driving behavior features such as in particular good capability of traction and roadholding at any ground conditions, that is when the road is dry, wet or covered with snow, and irrespective of the ride conditions, that is to say on rectilinear paths or in case of drift, i.e. when there are bends or side thrusts for example due to the effect of wind.

As regards roadholding on wet ground, longitudinal grooves are of the greatest importance in that, due to said orientation, they succeed in discharging the water collected in the tire contact-area, thereby ensuring the wheel/road contact and avoiding the well-known and dangerous aquaplane phenomenon.

For the above reason all tires except some special tires intended for machines having a very low ride speed and therefore unaffected by aquaplane phenomenon, are always provided with wide continuous longitudinal grooves which are oriented circumferentially.

On the contrary, as regards the tires capability of traction, this is connected with the presence of transverse grooves in the tread and for this reason, in the absence of said grooves, the longitudinal ones generally have a zigzag course so as to exhibit inclined edges relative to the vehicle ride direction.

The efficiency of the transverse grooves as regards the capability of traction becomes increasingly greater as the inclination of said grooves approaches the axial direction: on the contrary, this axial inclination is negative as regards the possibility of discharging the water picked up from ground because this orientation makes it difficult to pump the water in the longitudinal grooves under the contact-area, and also as regards the directional stability of the tire above all at the high speeds achieved with present motor-vehicles.

Therefore the attempts to reach the best compromise between the different requirements of modern tires have brought to the development of both symmetric and asymmetric tread patterns relative to the diametrical plane of the tire, having rectilinear circumferential grooves and transverse grooves all inclined in the same direction or alternately in the opposite direction with respect to the axial direction of the tire: the so-called "helix-shaped" and "fish bone-shaped" patterns are well-known and widely spread and represent an example of the foregoing.

Upon increasing of the performance required from tires as regards power and speed, the longitudinal grooves have shown a new drawback, specifically in tires having a radial carcass.

Radial carcass tires, usually referred to as "radial tires", are those provided with a carcass the reinforcing cords of which substantially lie in radial planes, that is containing the rotational axis of the tire, and an annular reinforcing structure which is circumferentially inextensible (the so-called belt) disposed on the crown of the carcass, inserted between the carcass and the tread band and ensuring dimensional stability of the tire, particularly in the circumferential direction, as well as the necessary drive behaviour qualities.

In fact a tire provided with a radial carcass alone, due to its structure, would not be dimensionally steady under the effect of the efforts due to inflating pressure and those connected with the centrifugal force in use, and would substantially be incapable of offering good driving features, in particular directional and transverse stability.

It is known that roadholding in case of drift and the transverse stability of the radial tire closely depend on the strength of the belt structure to axially-acting tangential efforts transmitted between the tire and the road; on the other hand, it has been found that in tires suitable for vehicles offering high power and speed performance said strength is also conditioned by the geometry of the tread pattern.

In particular, the structural strength of the belt is generally limited due to the fact that, at the longitudinal tread grooves, where the tread thickness is clearly reduced to a minimum value, the belt has a preferential deformation area, that is a "hinge". This hinge, when the tire in use is subject to side forces, triggers a tire of stress causing the dynamic yielding of the belt structure, which gives rise to a decrease in roadholding and general behavior qualities of the tire and consequently of the vehicle at high speed.

In order to overcome these drawbacks tread patterns devoid of longitudinal grooves have been so far proposed, only having transverse grooves inclined to both axial and circumferential directions of the tire, optionally emerging in the axial direction on the tire shoulders, such as for example the tread described in British Patent GB 2,229,974.

However tires provided with this type of pattern, as well as those mentioned above and exhibiting a helix-shaped pattern suffer the drawback of developing, under rectilinear ride conditions, a drift force of high strength and greatly changing on varying the torque applied to the tire, which hinders the driving and, without varying the steering angle, causes the vehicle to slide under acceleration and braking conditions, bringing about an uncontrolled change in the trajectory thereof. For the purpose of restraining this undesirable tire behavior, attempts are usually made to balance this drift force by mounting the tires on the vehicle in a particular manner, that is with the tread patterns disposed symmetrically to the vehicle axis.

SUMMARY OF THE INVENTION

In accordance with the present invention it has been found that tires provided with a tread pattern exhibiting transverse grooves all inclined in the same way, either associated with circumferential grooves or not, so as to break the transverse ribs into a plurality of plugs, offer a qualitatively-limited performance that cannot be improved by said "symmetric" mounting of the tires to the vehicle.

Still in accordance with the invention it has been found that an overall equilibrium situation can be reached within the same tire by relying on the tread plug to develop drift forces balancing those developed by the plugs themselves by effect of the direction taken by the transverse grooves, provided that longitudinal grooves inclined to angles of predetermined value relative to the circumferential direction of the tire are adopted in combination with said transverse grooves.

Within this scope, by adopting particular arrangements, sizes and shapes for said longitudinal and trasverse grooves, further improvements have been surprisingly reached as regards specific features of the tire such as lack of noise and drainage capability.

The present invention relates to a tire for vehicle wheels comprising an annular carcass of toroidal form terminating in two beads each provided with at least an annular circumferentially-inextensible reinforcing core for assembling said tire to a corresponding mounting rim, at least a carcass ply provided with reinforcing cords disposed in the radial direction, having its ends axially folded back from the inside to the outside around said bead-reinforcing annular cores, an annular circumferentially-inextensible reinforcing structure, disposed on the crown of said carcass, comprising at least two radially superposed layers of rubberized fabric provided with reinforcing cords disposed parallel to one another in each layer and in crossed relationship with those of the adjacent layer, inclined to the circumferential direction of the tire, and a tread band radially superposed to said structure, provided with a relief tread pattern comprising a plurality of longitudinal and trasverse grooves, characterized in that:

at least two of said longitudinal grooves have a portion of their extension included in the contact-area of the tire oblique to the circumferential direction of the tire, inclined to an angle ranging between 2° and 20° relative to said circumferential direction, said oblique longitudinal grooves having their opposite ends axially offset with respect to one another, and in that the intersection between said oblique grooves and transverse grooves forms plugs developing tangential forces on the contact-area of the tire that generally combine with one another so as to generate a resultant force having the axial component of substantially zero value.

Preferably said inclination angle does not exceed the value of 15°.

Said oblique longitudinal grooves can be all inclined in the same way or in opposite ways preferably symmetrically to the circumferential direction, on the opposite sides of the mid-circumferential tire (equator) of the tire.

As regards the transverse grooves, these too can be all inclined in the same way, parallel to one another or symmetrically inclined on the opposite sides relative to said mid-circumferential tire plane: preferably they extend axially from one end to the other of the tread pattern and open on said pattern edges so as to promote the side discharge of the water collected in the tire contact-area.

In a preferred embodiment said tire comprises the combination of:

a) a plurality of said oblique longitudinal grooves, all parallel to one another, at least two of them, disposed within the contact-area, exhibiting said oblique portion always lying in the same tread centre line with reference to the mid-circumferential plane of the tire, in a position axially external to any other contiguous oblique position in the axial direction, b) a plurality of transverse grooves extending axially between said two oblique end portions, each comprising at least a substantially rectilinear central length extending axially between two oblique axially-adjacent longitudinal grooves, said length being inclined in the opposite way relative to said pair of adjacent grooves according to an angle the absolute value of which ranges between 30° and 80° relative to the circumferential tire direction.

Preferably the angle delimited by said oblique portion of the longitudinal groove and said rectilinear length of the transvers groove, of opposite inclination, is included between 35° and 70°.

Conveniently each of said oblique longitudinal grooves extends from both portions of the mid-circumferential plane and is of at least the same length as the maximum size of the contact-area of the tire, measured on the inflated tire at the use pressure and loaded with the maximum permissible loading value.

As regards transverse grooves, they extend in an axially continuous way from one side to the other of the tread pattern and comprise a series of consecutive lengths, the two side lengths being substantially oriented in the axial direction and connected to said central length by a curvilinear portion.

BRIEF DESCRIPTION OF THE DRAWINGS

The present invention will be better understood with the aid of the following description and the accompanying drawings, in which.

DETAILED DESCRIPTION OF PREFERRED EMBODIMENTS

While the invention is adapted to any type of tire, the preferred tire offering the greatest advantages is the type designed for very powerful and fast cars, from which high performance is required at any environmental and ride condition.

Figure 1:
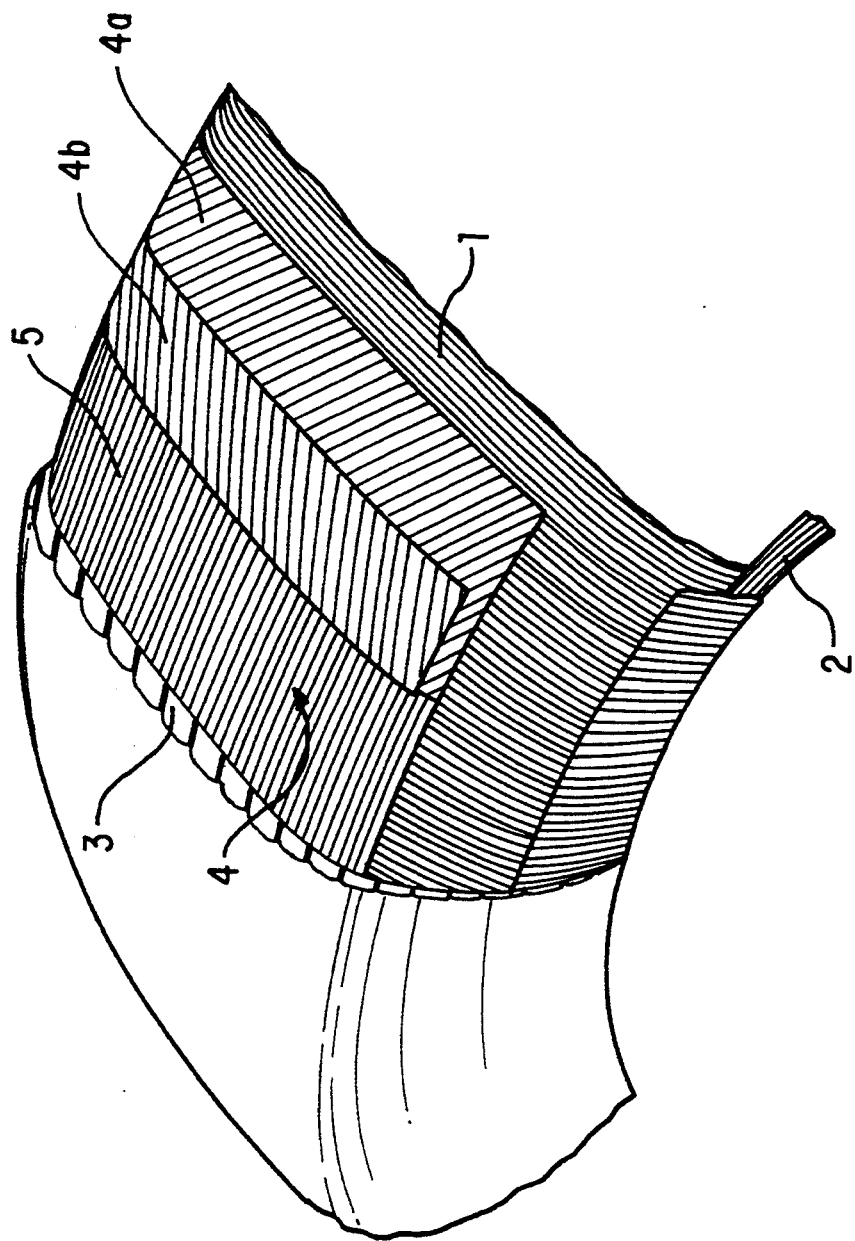
FIG. 1 is a right section of the general structure of a tire in accordance with the invention showing various layers thereof.

The structure of these tires, generally shown in FIG. 1, comprises a carcass 1 consisting of one or mope plies of rubberized fabric, provided with reinforcing cords lying in radial planes, that is containing the rotational axis of the tire, of toroidal ring-shaped configuration and exhibiting its ends axially folded back from the inside to the outside around two annular metal cores 2, usually known as bead cores, forming the bead reinforcement, that is the radially inner ends of said tire, and having the function of enabling assembling the tire with the corresponding mounting rim.

Disposed crown-wise to said carcass is a thick band 3 of elastomeric material, that is the tread band, in which a relief pattern including longitudinal and transverse grooves is formed, which is adapted to ensure, among other things, particular qualitative features to said tire, that is roadholding, good capability of traction, lack of noise, drainage capability and uniform wear.

Finally, disposed between the carcass and tread band is an annular circumferentially-inextensible reinforcing structure 4, usually referred to as belt, comprising at least two radially-superposed layers 4a, 4b of rubberized fabric, provided with textile and/or metal reinforcing cords disposed parallel to one another in each layer and in crossed relationship with the cords of the adjacent layer symmetrically to the mid-circumferential plane of the tire and, preferably, also a layer of textile cords 5 of the heat-shrinkable type, such as for example nylon cords oriented according to angles of value not higher than 10° relative to the circumferential tire direction, but usually oriented circumferentially, disposed in a radially outer position at least at the ends of said underlying layers, fop example as described in the U.S. Pat. No. 4,146,415 in the name of the same Applicant. As well known, this structure has the purpose of counteracting the efforts acting on the tire in use connected with the inflating pressure and centripetal force, and ensuring the necessary drive behavior qualities.

In accordance with the present invention said structure is combined with a tread pattern comprising (FIG. 2) at least a pair of oblique longitudinal grooves 7a and a plurality of transverse grooves 8 that mutually intersect thereby defining a corresponding plurality of plugs 6 of general rhomboidal form, so shaped and oriented that they develop tangential forces on the tire contact-area that generally combine together so as to generate a resultant force having an axial component of substantially zero value during a rectilinear ride at a constant speed, which value does not change even when the tire is submitted to a positive or negative torque, that is under accelerating or braking conditions.

The longitudinal grooves are defined as "oblique" in that they comprise at least an important portion of their longitudinal extension which is inclined to the circumferential direction of the tire, represented by line m—m in the mid-circumferential plane, so that the opposite ends of said grooves are axially offset with respect to one another. For example (FIG. 2), assuming that the circumferential extension of said oblique portion is coincident with the inner circumferential extension of the longitudinal groove and this extension is the same as the circumferential extension of the tire, it is apparent that the opposite ends 7h and 7k of the groove 7a are aligned along the same axial line l, on the opposite tread edges. In the present description the demarcation between oblique longitudinal grooves and transverse grooves is represented by a value of the inclination angle of said grooves or their most inclined portion, equal to 20° with reference to the diametrical plane of the tire.

According to the invention, the angle of inclination w of said oblique portion has a value included between 2° and 20°, preferably not higher than 15°.

Conveniently its value can be maintained the same as the inclination angle of the reinforcing cords of one of the different belt layers, preferably the one located at the radially outer position.

For "important portion" of the longitudinal extension of said grooves it is meant the fact that the circumferential extension of said oblique portion is at least the same as, but preferably greater than the maximum size L of the tire contact-area A; in this way it is possible to ensure that when a groove is engaged in the tire contact-area, it emerges from said area by at least one of its ends.

This feature is of great importance because oblique grooves, due to the fact that their ends are axially offset, are generally blind, that is closed at the opposite ends, although a connection between said opposite ends could be provided for the purpose of restoring the circumferential continuity of the grooves.

Measurement L of the tire contact-area, generally of elliptic form the major axis of which corresponds to L, is determined on a tire inflated to the use pressure and loaded with the maximum permissible load.

Preferably each of said grooves extends from one end of the tread pattern to the other: the number of said grooves 7a in the contact-area varies with the tread width, a minimum of at least two grooves being provided so as to give the tread, in combination with the transverse grooves and lamellae, a value of the "recess-/overall contact-area" ratio in the order of 0.26 to 0.34; referring to the oblique longitudinal grooves it is pointed out that the important element is the number of grooves in the contact-area, irrespective of the fact that said grooves are separated from one another or portions disposed in side by side relation belonging to a single spiral-shaped groove extending in the thickness of the tread band from one end of the band to the other.

Conveniently the maximum width of said longitudinal grooves is included between 3 mm and 12 mm and their depth ranges between 3 mm and 10 mm; said width and depth can vary along the longitudinal groove extension.

It is noted that all width and depth values of grooves cited in the present description are intended as measured on a new tire, mounted on its rim and inflated to the use pressure, but not loaded.

The shape of the right section can be both symmetric and asymmetric (sidewalls of different and/or varying sloping) and it can extend not only according to a rectilinear trajectory but also a curvilinear or a zigzag trajectory provided that it is always around an average direction inclined to an angle of the above specified value.

In greater detail each zigzag portion too will be preferably inclined according to an angle within the range of the above values.

Still preferably, the number of said grooves keeps constant along the circumferential tire extension: in other words the final end 7h of a groove in the axially outer position on the tread and the initial end 7k of the groove in the axially opposite position are in alignment along the same axial line l, so that where a groove ends another one begins, even if at said groove ends it is also possible to have both a thinning and a thickening (due to covering).

According to a preferred embodiment of the pattern, the blind ends of said longitudinal grooves terminate in a tapering portion for the purpose of varying the value of the "relief/recess" ratio in a continuous manner along the circumferential tire extension: said tapering portion goes on longitudinally in the form of a thin lamella, inclined as the corresponding oblique longitudinal groove, so as to create a certain number of plugs of the same size as those included between two longitudinal grooves, even in the tread portion between the tread edge and the first axially-adjacent oblique longitudinal groove.

In combination with said longitudinal grooves, the pattern also comprises a plurality of transverse grooves 8 together defining said plugs 6; preferably plugs disposed in an axially inner position on the tread pattern are of rhombic configuration, their side measuring 15 to 30 mm, and they all have approximately the same sizes and area, smaller than that of the shoulder plugs located at an axially outer position.

Preferably said transverse grooves are continuous from one tire sidewall to the other and open on the tread edges, so as to increase the drainage capability of the tire; in fact they help in collecting water from the contact-area, pumping it into the oblique grooves and discharging it sideways of the tire, thereby ensuring the maintaining of the tire/road contact.

Conveniently the maximum width of said transverse grooves is included between 2 mm and 10 mm and their depth ranges between 3 mm and 10 mm. The shape of the right section can be symmetric or asymmetric (variable-slope sides), and width and depth can vary too along the longitudinal groove extension; in particular it is convenient that the right section of said grooves progressively increases from the tread centre to the ends, as shown in FIG. 2.

Obviously, for said grooves too, many embodiments are possible (that is rectilinear and curvilinear extensions, which may be symmetric, asymmetric and directional to the tire centre line); however it will be advisable to choose those forms that in combination with their own size features (width and depth) and those of the oblique grooves, within the above inclination values, appear to be the most appropriate to generate plugs having moments if inertia mutually integrating so as to create an equilibrium situation preventing negative drift effects from occurring during the tire running, both at a constant speed and under acceleration and/or braking conditions; in fact without an appropriate dimensioning of the plugs, which can be determined and at all events experimentally verified afterwards, these effects would surely be present in the tread of the invention, due to the oblique (sub-circumferential) and unidirectional inclination of the grooves.

Figure 2:
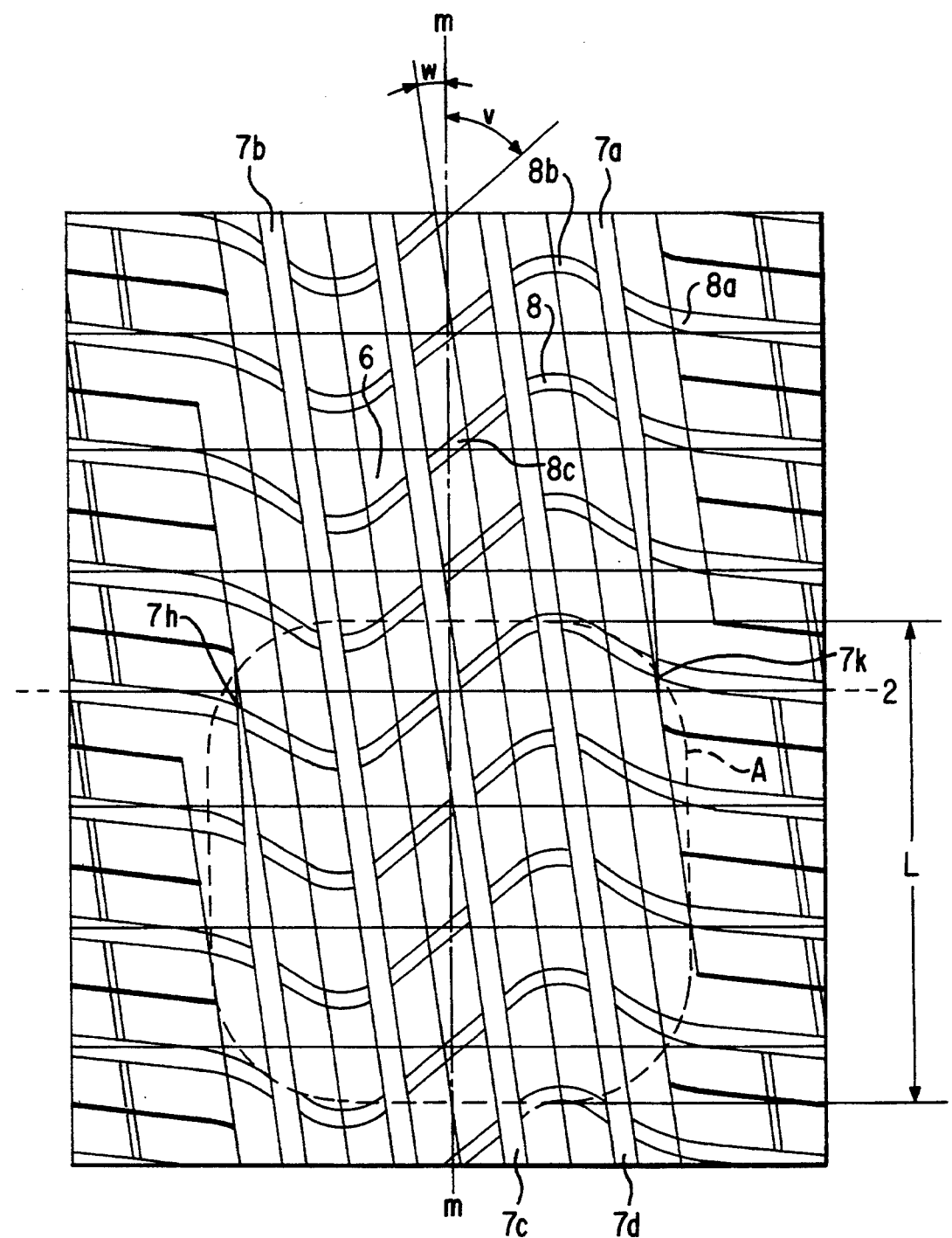
FIG. 2 is a plan view of the crown portion of the tire shown in FIG. 1, highlighting the tread pattern of the invention according to an asymmetric and non directional embodiment relative to the mid-circumferential plane of the tire.

In the preferred embodiment of the tire shown in FIG. 2, referring to a prototype tire (measures 196/60 R 15) manufactured by the present assignee, the tread is comprised of four oblique longitudinal grooves 7a, 7b, 7c, 7d, all parallel to one another two of which still with reference to a specific contact-area A, exhibit an oblique portion 7a, 7d always lying in the same tread centre line with reference to the mid-circumferential plane m—m of the tire at a position axially external to any other contiguous oblique position 7b, 7c in the axial direction.

In combination with said longitudinal grooves, the pattern also comprises said plurality of transverse grooves 8 extending axially between said two oblique end portions; each of them comprises at least a substantially rectilinear central length 8c extending axially between two oblique axially-adjacent longitudinal grooves 7b, 7c relative to the same circumferential direction of the tire, according to an angle v of absolute value of which is between 30° and 80°.

It will be noted that the established inclination values for the oblique portions of said longitudinal grooves and said central rectilinear length of the transverse grooves make it possible to provide a width for the angle w+v defined between said oblique portion and rectilinear length, included between 32° and 100°, said width being however preferably maintained in the range of 35° to 70°.

In accordance with the foregoing, in the embodiment shown in FIG. 2 the corresponding inclinations are of 7° for the oblique portions of the longitudinal grooves and 50° for the central lengths of the transverse grooves respectively, the value of the included angle being equal to 57°.

Still in accordance with the inventive pattern shown in FIG. 2, the transverse grooves have a sinusoidal shape substantially extending astride of a line 1 which is axially oriented: more particularly, said grooves substantially consist of five consecutive lengths 8a, 8b, 8c, 8b, 8a the two side lengths 8a being oriented in the axial direction, substantially tangent to said line 1, and connected by a curvilinear portion 8b to said central length 8c.

It will be noted that the tread shown in FIG. 2 could be reproduced in a mirror image relative to the centre line m—m, thereby achieving a directional pattern applying to each tread centre line the concept of having a resultant of the tangential force developed by the plugs having an axial component of substantially zero value.

Figure 3:
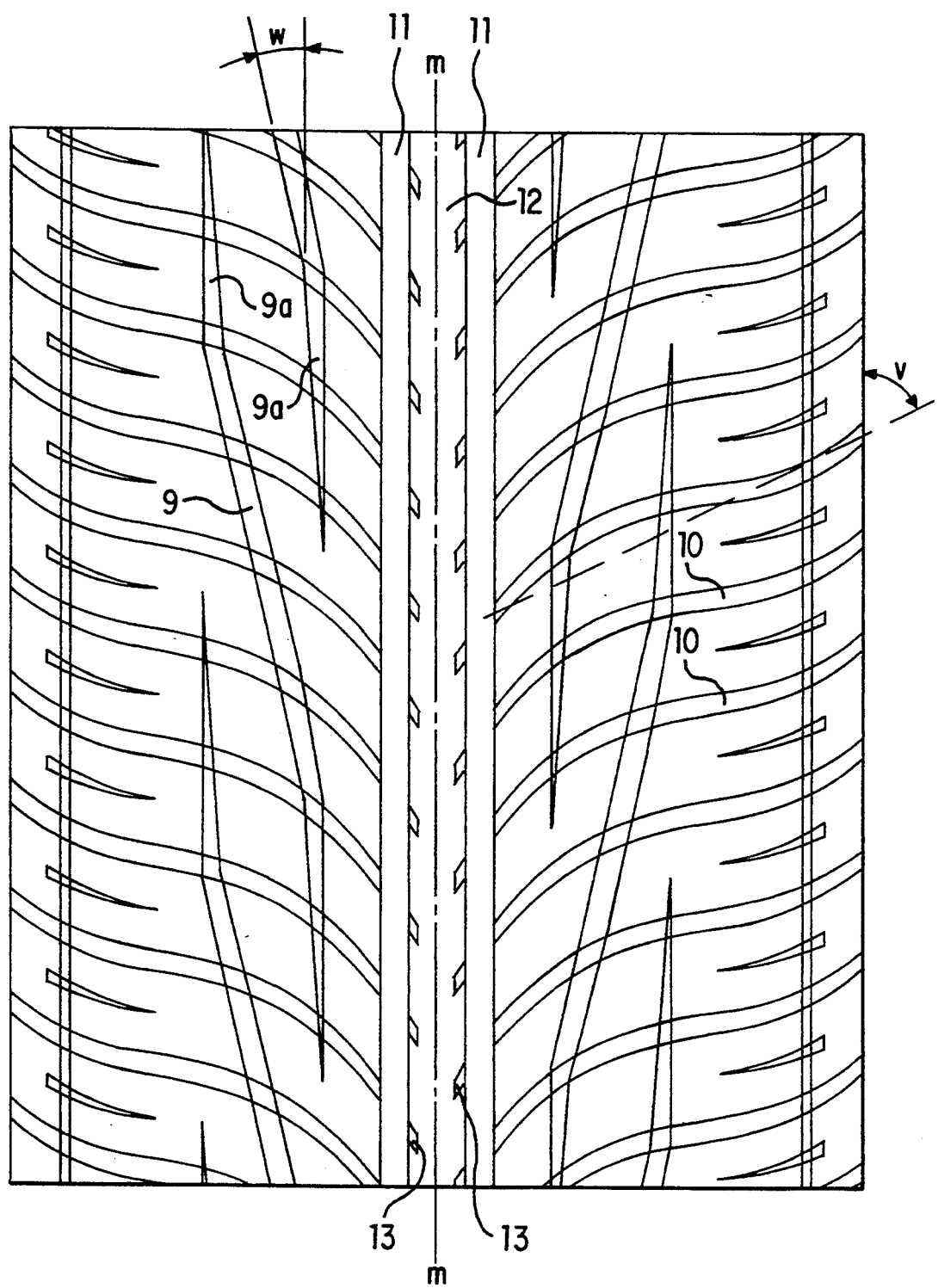
FIG. 3 is a plan view of the tread pattern of the invention according to a second aspect thereof and more particularly in a directional model, symmetric to the mid-circumferential plane of the tire.

FIG. 3 shows the pattern of the invention in a directional model symmetric to the mid-circumferential plane of the tire; this symmetric arrangement both of the oblique grooves and the transverse grooves minimizes by itself the drift effects generated in the tire by said grooves being directional, due to the mutual reducing to zero of the axial component of the resultant tangential force developed by the plugs; however the application of the inventive criteria to these patterns enables the other already mentioned advantages to be obtained, that is lack of noise and roadholding on wet roads.

In the foregoing embodiment, in addition to the oblique longitudinal grooves 9 and transverse grooves 10 the pattern also comprises at the equatorial tire plane, that is where said "hinge effect" is practically negligible, two continuous and rectilinear circumferential grooves 11 located on either side of the diametrical plane and defining a narrow continuous central rib 12 disposed at the tread centre line.

The previously described oblique longitudinal grooves 9 in this type of pattern are inclined in the opposite direction, preferably in a symmetric manner, on the opposite sides of the mid-circumferential plane m—m, still according to an angle w the value of which ranges between 2° and 20°, in the same manner as those of the pattern previously shown; all other considerations relating to the dimensional sizes of the previously described tread elements (grooves and plugs) apply to this pattern.

In accordance with a preferred alternative embodiment the tapering portions 9a of said grooves, of a length not greater than that of the adjacent oblique portion, are circumferentially oriented instead of being inclined to the mid-circumferential plane.

Since it is a directional pattern, the transverse grooves 10 which ape kept separated from one another by said continuous central rib 12, are all converging, preferably parallel to one another, towards the mid-circumferential tire plane; they have a sinusoidal development about an inclined axis b, in accordance with the invention, of an angle v included between 30° and 80° relative to the mid-circumferential plane.

Said grooves and their axes are disposed symmetrically to a mid-circumferential plane of the tire; they open into the continuous axially internal circumferential groove disposed on the same side as the plane m—m and preferably extend over a short portion thereof also within the side of the central rib 12 defined by said two continuous circumferential grooves, thereby creating a notch. The extension of said notches 13 in the axial direction is preferably shorter than half the rib width; in other words the axially internal end of said notches does not go beyond the centre line m—m of the tread.

In the tire shown the oblique grooves are inclined in the same way as the transverse grooves lying in the same tread centre line, that is the oblique longitudinal and transverse grooves have the same converging direction towards the diametrical tire plane: however, in particular embodiments, also opposite converging directions can be used.

The inventive tire attains the intended purposes and achieves many and important advantages.

First of all to previously discussed drift effect causing driving unreliability. directional unsteadiness and undesirable trajectory variations is substantially eliminated.

In fact, extension, shape and sizes of the longitudinal and transverse grooves are determined so as to generate such an equilibrium condition (mutual compensation) of the momenta of inertia of the different plugs that the occurrence of drift effects is prevented both at a constant speed and during the application of torque and/or braking torque.

In this connection the applicant has been able to verify and quantify the improvement achieved with the tire of the invention by a series of tests made on prototypes of tires in accordance with the invention as compared with the best traditional tires, measuring the drift force developed by the tires set in rotation with a zero drift angle against a metal drum (wheel road) for different values of the applied positive and negative torque, as well as for a torque of zero value.

The results have proved that in tires of the invention the development of a drift force is of very reduced quantity and above all substantially constant on varying the torque value applied to the tire axis.

The efficiency of the tire under aquaplane conditions does not appear to be reduced as compared to the best level already achieved by known tires provided with rectilinear circumferential grooves, because said oblique grooves by virtue of their length, greater than the maximum size of the tread contact-area, always have at least one end emerging at the outside of said area thereby ensuring the discharge of the water collected from the road.

The water drainage is also maximized by the presence of oblique longitudinal grooves in combination with the particular sinusoidal shape of the continuous transverse grooves extending in the axial direction and emerging on the tire shoulders, which create a "milling" effect of the liquid front, particularly in the presence of deep water layers and when the tire is under torque.

The noise of the tread pattern is still more reduced and can be more easily governed since the positioning of the plugs in the transverse direction which does not take place as repeatedly as before maximizes the spreading and reduces the level of the "acoustic trouble " during the tire rolling.

In fact, as compared with the typical pitch sequence of a general tread pattern, in which the only available variable for intervening on the tire noise is constituted by the pitch length (plug and circumferentially adjacent recess) the pitch sequence of the pattern of the invention comprises another variable consisting in the position of the plugs in the transverse direction.

In other words, two axially offset consecutive plugs generate less acoustic trouble than when they are circumferentially aligned.

We claim:

1. A tire for vehicle wheels comprising an annular carcass of toroidal form having two beads, each bead provided with at least one annular circumferentially inextensible reinforcing core for assembling said tire to a corresponding mounting rim,
    at least one carcass ply provided with reinforcing cords disposed in the radial direction, said reinforcing cords having ends axially folded back from the inside to the outside around said bead reinforcing annular cores,
    an annular circumferential inextensible reinforcing belt layer, extending circumferentially around and radially outward of said carcass and comprising at least two radially superposed layers of rubberized fabric provided with reinforcing cords disposed parallel to one another in each layer and in crossed relationship with those of an adjacent layer, said reinforcing cords being inclined to the circumferential direction of the tire, and a tread band radially superposed on said reinforcing belt layer and provided with a tread pattern comprising a plurality of longitudinal parallel grooves and transverse grooves,
    said tread having a ground contact area with at least two of said longitudinal grooves having portions thereof included in said area, all of which are rectilinear and continuous, said portions being parallel to each other and oblique to the circumferential direction of the tire, inclined at an angle ranging between 2° and 20° relative to said circumferential direction, and
    substantially all of said transverse grooves extending continuously from one side to the other of the tread pattern and having a sinusoidal configuration extending astride of an axially oriented line of the tire, and comprising five consecutive lengths with two side lengths being substantially oriented in the axial direction and connected by a curvilinear portion to a central rectilinear length crossing the meridian plane of the tire and axially extending between at least two axially adjacent pans of said oblique portions of the longitudinal grooves, said central rectilinear length being inclined in an opposite sense relative to said pair of oblique portions according to an angle between 30° and 80° relative to the midcircumferential plane of the tire;
    whereby the intersection between said oblique portions and said transverse grooves defines plugs which develop tangential forces in the contact area of the tire that combine together so as to generate a resultant force having an axial component of substantially zero value.

2. A tire according to claim 1, wherein said inclination of the oblique portions does not exceed 15°.

3. A tire according to claim 1, wherein said oblique portions of the longitudinal grooves are oriented parallel to the cords of the radial outer belt layer.

4. A tire according to claim 1, wherein said oblique portions of the longitudinal grooves have tapering ends.

5. A tire according to claim 1, wherein said oblique portions of the longitudinal grooves emerge on at least one of the ends thereof in a rectilinear portion, circumferentially oriented, of shorter length than the oblique portion.

6. A tire according to claim 1, wherein there are two of said oblique portions on each side of the midcircumferential plane of the tire and disposed within the contact area, both oblique portions on one side lying on the same tread center line with reference to the midcircumferential plane of the tire and lying in a position axially external to any other axially contiguous oblique portion.

7. A tire according to claim 1, wherein the angle delimited by said oblique portion of the longitudinal grooves and said rectilinear central length of the transverse grooves, of opposite inclination, is between 35° and 70°.

8. A tire according to claim 1, wherein said oblique portion of the longitudinal grooves is at least of the same length as the maximum size of the tire contact area and extends from both sides of the midcircumferential plane of the tire and towards the tread ends.

* * * * *